US011019281B2

(12) United States Patent
Qiu

(10) Patent No.: US 11,019,281 B2
(45) Date of Patent: May 25, 2021

(54) AUGMENTED REALITY TELESCOPE

(71) Applicant: Light Speed Vision (Beijing) Co., Ltd., Beijing (CN)

(72) Inventor: Hongyun Qiu, Beijing (CN)

(73) Assignee: Light Speed Vision (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/551,737

(22) Filed: Aug. 27, 2019

(65) Prior Publication Data

US 2019/0387181 A1 Dec. 19, 2019

Related U.S. Application Data

(63) Continuation of application No. PCT/CN2018/096821, filed on Jul. 24, 2018.

(30) Foreign Application Priority Data

May 21, 2018 (CN) .......................... 201810491198.6

(51) Int. Cl.
*H04N 5/265* (2006.01)
*G02B 23/04* (2006.01)
*H04N 5/262* (2006.01)

(52) U.S. Cl.
CPC ............. *H04N 5/265* (2013.01); *G02B 23/04* (2013.01); *H04N 5/2628* (2013.01)

(58) Field of Classification Search
None
See application file for complete search history.

(56) References Cited

U.S. PATENT DOCUMENTS

2004/0090672 A1   5/2004  Goto et al.
2012/0188369 A1*  7/2012  Griesbach ............ H04N 5/2353
                                                              348/143

FOREIGN PATENT DOCUMENTS

| CN | 2485667   | Y |   | 4/2002 |
| CN | 2624233   | Y |   | 7/2004 |
| CN | 102495464 | A |   | 6/2012 |
| CN | 106338819 | A |   | 1/2017 |
| CN | 106842542 | A | * | 6/2017 |
| CN | 106842542 | A |   | 6/2017 |

* cited by examiner

*Primary Examiner* — Heather R Jones

(57) ABSTRACT

An augmented reality telescope comprises an optical image acquisition module, an electronic image acquisition module, an imaging module communicating optically to the optical image acquisition module and the electronic image acquisition module, and an image observation module open optically to the imaging module. The optical image acquisition module is arranged for the acquisition of object images by means of optical acquisition, and the electronic image acquisition module is arranged for the acquisition of object images in the form of electronic imaging. Since the imaging module is simultaneously open optically to the optical image acquisition module and the electronic image acquisition module, a mixed display of the optical image and the electronic image is realized.

8 Claims, 6 Drawing Sheets

A

AUGMENTED REALITY TELESCOPE

CROSS REFERENCE TO RELATED APPLICATIONS

The present application is a Continuation Application of PCT Application No. PCT/CN2018/096821 filed on Jul. 24, 2018, which claims the benefit of Chinese Patent Application No. 201810491198.6 filed on May 21, 2018. All the above are hereby incorporated by reference.

TECHNICAL FIELD

The present invention relates to a telescope, and in particular to an augmented reality telescope.

BACKGROUND ART

A telescope is an optical instrument for observing remote objects by a lens or mirror and other optical devices. The light is refracted by a lens or reflected by a concave mirror to enter a lens series and thus converge into an image, which is then seen through an amplifying eyepiece. It is also known as a "Thousand-Mile-Vision Eye". The first function of a telescope is to enlarge the angle of a remote object open to the eye so that it can see the details of the angular opening clearly. The second function of the telescope is to collect a beam that is much thicker than the eye (maximum 8 mm at maximum) through the objective lens into the eye so that the observer can see a dim object that is not visible to an naked eye.

A conventional telescope simply achieves the effect of light collecting by means of an optical lens disposed in the telescope to reflect and/or refract, and imaging function is thus realized. However, such telescopes are not suitable for the use in areas with high imaging requirements. To this end, technicians have developed image sensors to enhance the imaging of telescopes. That is, an objective lens of the telescope collects the light onto an image sensor, through which the optical signal is converted into an electronic signal, which is processed by an image processor to present a high-quality image on a microlens, and finally the high-quality image rendered on the microlens is viewed via an eyepiece.

Although the arrangement of an image sensor has enhanced the imaging effect of telescopes, the simple adoption of the image sensor cannot meet the high requirements of people for optical images. The problem arises in that the image presented by the microlens is an electronic image obtained simply by the image processor via image processing, making the visual effect limited and the content of the electronic image unitary.

SUMMARY OF THE INVENTION

It is an object of the present invention to provide an augmented reality telescope, which has the advantage of being able to achieve a display effect on an object by mixing the optical image and the electronic image.

The above technical purpose of the present invention is achieved by the following technical solutions.

A augmented reality telescope, comprising: an optical image acquisition module, an electronic image acquisition module, an imaging module communicating optically with the optical image acquisition module and the electronic image acquisition module, and an image observation module open optically to the imaging module.

Preferably, the image observation module comprises an eyepiece and/or a display screen.

Preferably, the optical image acquisition module comprises a primary objective lens.

Preferably, the primary objective lens is provided with the imaging module.

Preferably, the electronic image acquisition module comprises a secondary objective lens, an imaging chip communicating optically to the secondary objective lens, an image processor connected to the imaging chip, and an electronic display connected to the image processor.

Preferably, the imaging chip comprises a CMOS sensor or a CCD sensor.

Preferably, the imaging module comprises an imaging lens defining an optical axis and an image mixing unit for integrating an optical image output from the optical image acquisition module and an electronic image output from the electronic image acquisition module into the imaging lens.

Preferably, the image mixing unit comprises a partially transmissive lens for reflecting the optical image to the imaging lens and transmitting the electronic image to the imaging lens.

Preferably, a transmissive lens set is provided between the partially transmissive lens and the electronic display so that the transmissive lens set can transmit the electronic image displayed on the electronic display to the imaging lens.

Preferably, the transmissive lens set consists of a plurality of convex lenses and/or concave lenses.

Preferably, the transmissive lens set is slidably connected to the telescope housing along the optical axis of the imaging lens.

Most preferably, a tuning lens set is provided between the transmissive lens set and the imaging lens for adjusting the size of the image electronic projected on the imaging lens. Therefore, the present invention has the following beneficial effects: since the optical image transmission path is changed by the arrangement of the partially transmissive lens, the optical image and the electronic image are collectively displayed on the same imaging lens, thereby realizing a mixed display of the optical image and the electronic image on the same imaging lens. When observing the image on the imaging lens through the eyepiece, the user can observe the mixed image, such that the user can view the specific image of the object by the optical image information, and also a variety of display functions can be implemented by cooperating with the electronic image. At the same time, it is known to those skilled in the art that a transmissive lens is disposed in the eyepiece lens, so that the image transmitted to human eyes can be further optically processed, enabling human eyes to observe the content on the imaging lens more clearly and comfortably.

Figure 1:
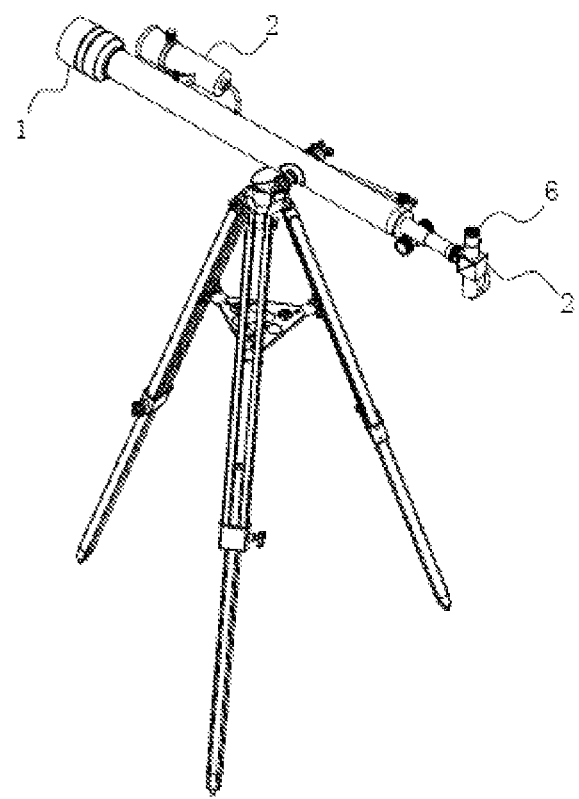
FIG. 1 is a schematic view showing the overall structure of a Augmented reality telescope according to the invention.

In the drawings: 1—a first objective lens; 2—an electronic image acquisition module; 21—a second objective lens; 22—an imaging chip; 23—an image processor; 24—an electronic display; 3a partially transmissive lens; 41—a transmissive lens set; 42—a tuning lens set; 5—an imaging lens; 6—an eyepiece lens.

DETAILED DESCRIPTION OF THE INVENTION

The invention will be further described in detail below with reference to the accompanying drawings. The same components are denoted by the same reference numerals. It should be noted that such words as "front", "back", "left", "right", "upper" and "lower" used in the following description refer to the directions shown in FIG. 1, and such words as "bottom" and "top", "inside" and "outer" refer to the directions toward or away from the geometric center of a certain component.

Embodiment 1

An Augmented reality telescope, as shown in FIG. 1, comprises an optical image acquisition module, an electronic image acquisition module 2, an image observation module communicating optically with the optical image acquisition module and the electronic image acquisition module 2, wherein the image observation module includes but not limited to an eyepiece lens 6 and/or a display screen, preferably an eyepiece lens 6. When the telescope is used, the optical image can be transmitted to the image observation module by the optical image acquisition module, and the electronic image information can be transmitted to the image observation module by the electronic image acquisition module 2, thereby enabling the user to simultaneously observe the electronic image information and the optical image information on the image observation module. The optical image acquisition module and the electronic image acquisition module 2 both collect some image information from the object through the objective lens and hereby the optical image acquisition module is named as the primary objective lens 1 and the electronic image acquisition module 2 is named as the secondary objective lens 21. Meanwhile, when the image observation module is set as a display screen, the display screen can be set as a plurality of sets so that several users can simultaneously observe the image acquisition information through the telescope; when the image observation module is set as the eyepiece lens 6, a human eyes can observe the image acquisition information more clearly and comfortably since the eyepiece lens 6 can optically process the image information as it goes through the eyepiece lens 6.

Further, the primary objective lens 1 and the secondary objective lens 21 may be separately disposed and may be set in the same protective housing so that the telescope has a monolithic structure, which is not limited herein but falls within the scope of the description of the embodiment.

Figure 2:
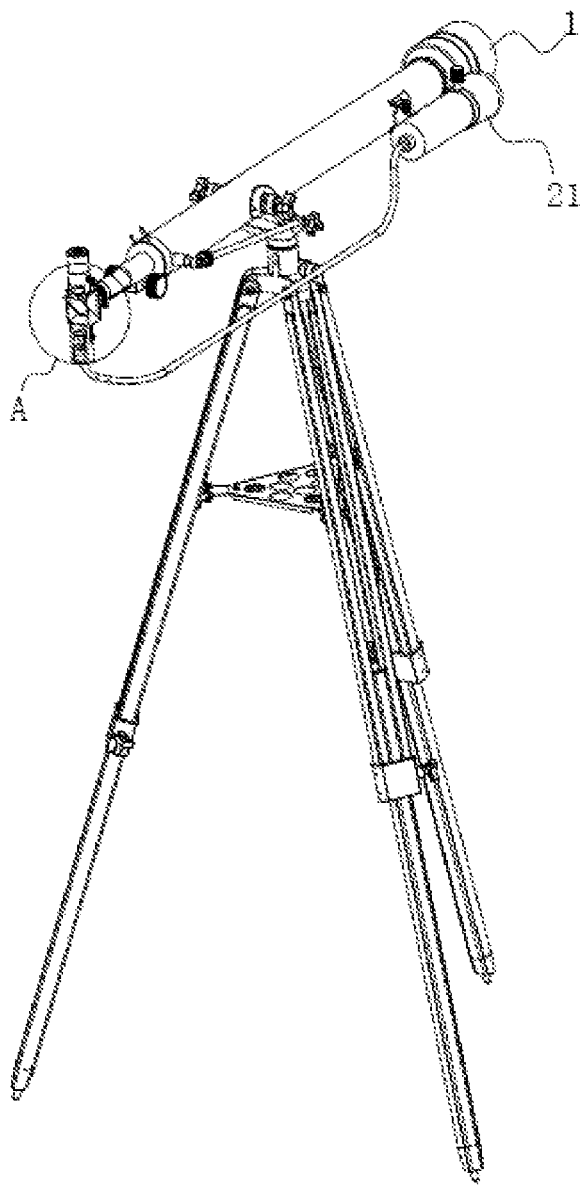
FIG. 2 is a schematic diagram of an electronic image acquisition module of the invention.
Figure 3:
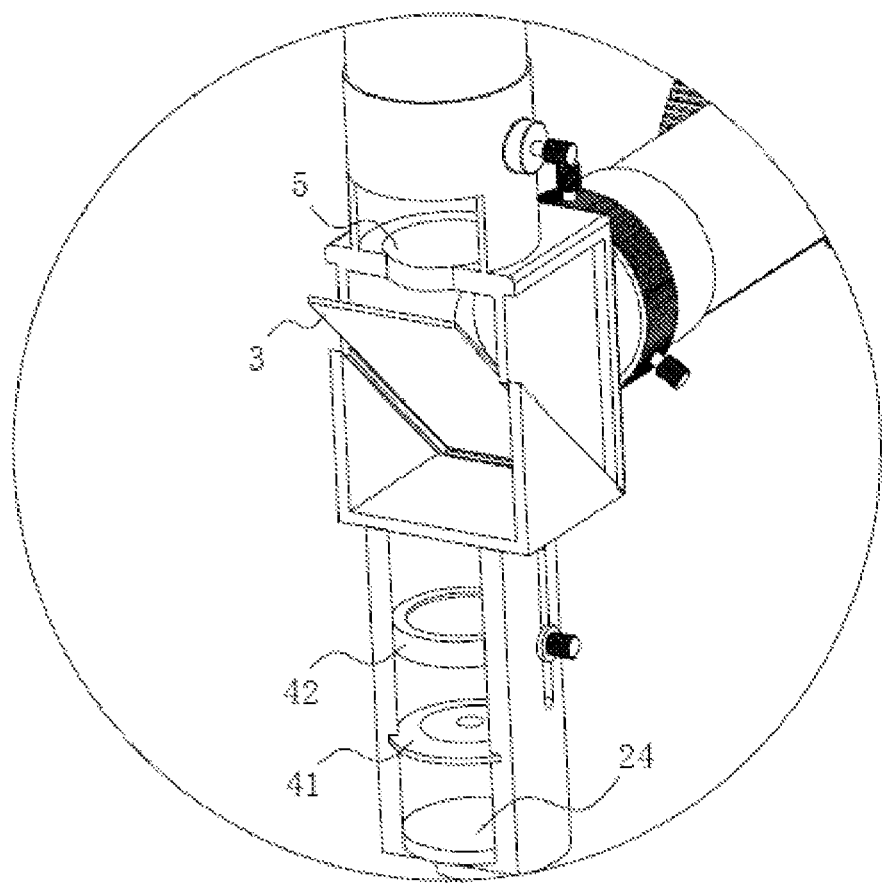
FIG. 3 is an enlarged view of portion A in FIG. 2.
Figure 4:
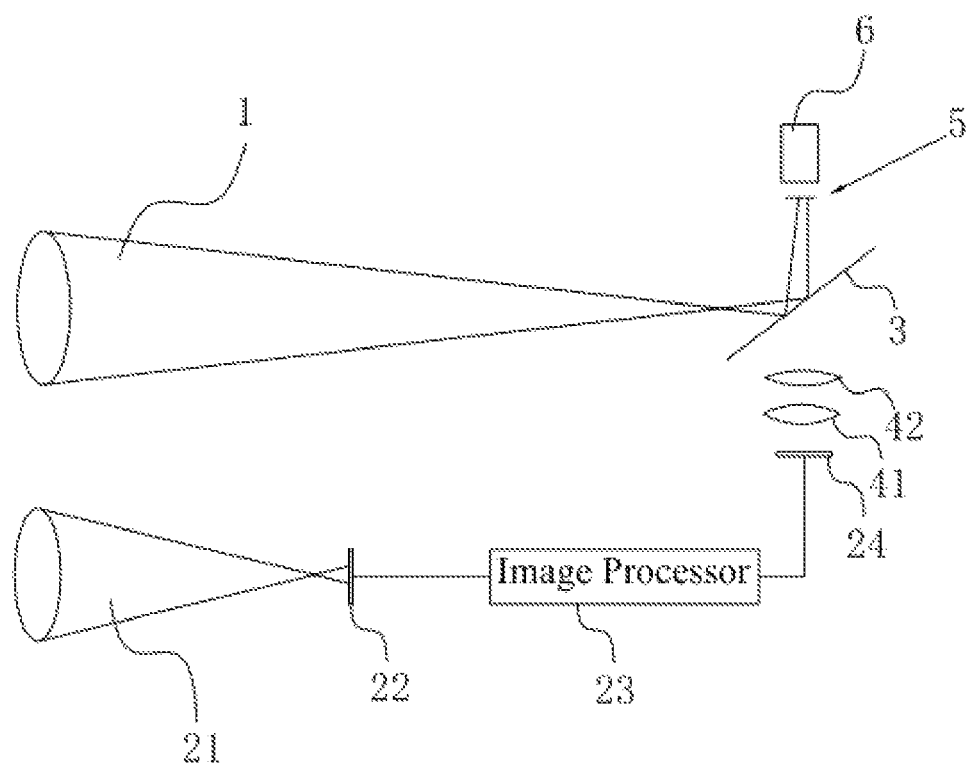
FIG. 4 shows an optical path in an embodiment of the invention.

As shown in FIGS. 2, 3 and 4, the electronic image acquisition module 2 includes a secondary objective lens 21, an imaging chip 22 behind the secondary objective lens 21, an image processor 23 that connects the imaging chip 22, and an electronic display screen 24 that connects an image processor 23, wherein an imaging module is disposed between the electronic display 24 and the eyepiece lens 6. The imaging module includes an imaging lens 5 and an image mixing unit, which mixes the optical image output from the optical image acquisition module and the electronic image output from the electronic image acquisition module 2 and displays both of them on the imaging lens 5; the imaging chip 22 includes but not limited to a CMOS sensor or a CCD sensor, preferably a CMOS sensor, and an image processor 23 that cooperates with the CMOS sensor is an electronic component commonly used in conventional optical cameras which is not specifically limited herein but falls within the scope of the description of the embodiment.

Wherein, the image mixing unit includes a partially transmissive lens 3 for partially reflecting the optical image to the imaging lens 5 and transmitting the electronic image to the imaging lens 5, and the angle between the partially transmissive lens 3 and the axis of the primary objective lens 1 is preferably 45 degrees. The imaging lens 5 is disposed between the partially transmissive lens 3 and the eyepiece lens 6, and the partially transmissive lens 3 and the electronic display 24 are disposed on the opposite sides of the lens set 41 and 42, and the optically path of the partially transmissive lens 3 and the electronic display 24 is perpendicular to the axis of the primary objective lens 1. The angle between the axis of the primary objective lens 1 and the partially transmissive lens 3 is not particularly limited to 90 degrees; as long as the optical image reflected by the partially transmissive lens 3 and the transmitted electronic image information can be implemented with a mixed display on the imaging lens 5, it falls within the scope of the description of the embodiment. When the primary objective lens 1 collects an optical image, it can be imaged on the imaging lens 5 via the reflection of the partially light-transmissive lens 3. Meanwhile the optical signal collected by the secondary objective lens 21 is converted into an electronic image information and displayed on the electronic display 24; the electronic image information of the electronic display 24 is shown into the lens through the partially transmissive lens 3, thereby realizing the mixed display of the electronic image information and the optical image information through the imaging lens 5.

Further, in order to make the electronic image information transmitted on the imaging lens 5 more clearly, a transmissive lens set 41 fixed to the telescope is disposed between the electronic display 24 and the partially transmissive lens 3. The transmissive lens set 41 is composed of a plurality of convex lenses and concave lenses. Further, a tuning lens set 42 slidably connected to the telescope is disposed between the transmissive lens set 41 and the partially light-transmissive lens 3. When the transmission lens set 41 or/and the electronic display 24 is replaced, or the structure inside the telescope is damaged during the movement of the telescope, it will be difficult to clearly display the electronic image information of the electronic display 24 on the imaging chip 22, and at such time, the position of the tuning lens set 42 can be adjusted so as to adjust the imaging effect of the electronic image of the electronic display 24 on the imaging lens 5.

Particularly, the adjustment mode of the tuning lens set 42 may include mechanical adjustment mode or electric adjustment mode. Here, it is preferable to provide a slot in the telescope housing along the axis of the imaging lens 5, and adjust the position of the tuning lens set 42 by a bolt fixed to the tuning lens set 42 and passing through the slot, but the mode of adjusting the movement of the tuning lens set 42 along the axis of the imaging lens 5 is within the protection scope of the present embodiment.

By means of the partially transmissive lens 3, the optical image and the electronic image are collectively displayed on the same imaging lens 5, thereby realizing the mixed display of the optical image and the electronic image on the same imaging lens 5. When observing an image on the imaging lens 5 through the eyepiece, the user can observe a mixed image so that the user can view the specific image of an object through the optical image information and the electronic image. Meanwhile, as is known to those skilled in the art, a transmissive lens is disposed in the eyepiece lens 6 so that the image transmitted to the eye can be further optically processed, enabling the eye to observe the image projected on the imaging lens 5 more clearly and comfortably.

Embodiment 2

The difference between this embodiment and embodiment 1 is that the tuning lens set 42 is not disposed in the embodiment, and the transmitting lens set 41 is disposed slidably with the telescope housing along the axis of the imaging lens 5. Due to different refraction angles between different transmissive lens sets 41, the images projected onto the imaging lens 5 by different transmissive lens sets 41 are different in size. When the electronic display 24 or the transmissive lens set 41 needs to be replaced, it may not match due to the size of the electronic display 24 and the positional relationship between the transmission lens sets 41. At such time the transmission lens set 41 can slide to adjust the position of the transmission lens set 41, so that the images from the primary and secondary objective lens can match each other on the imagining lens.

Embodiment 3

Figure 5:
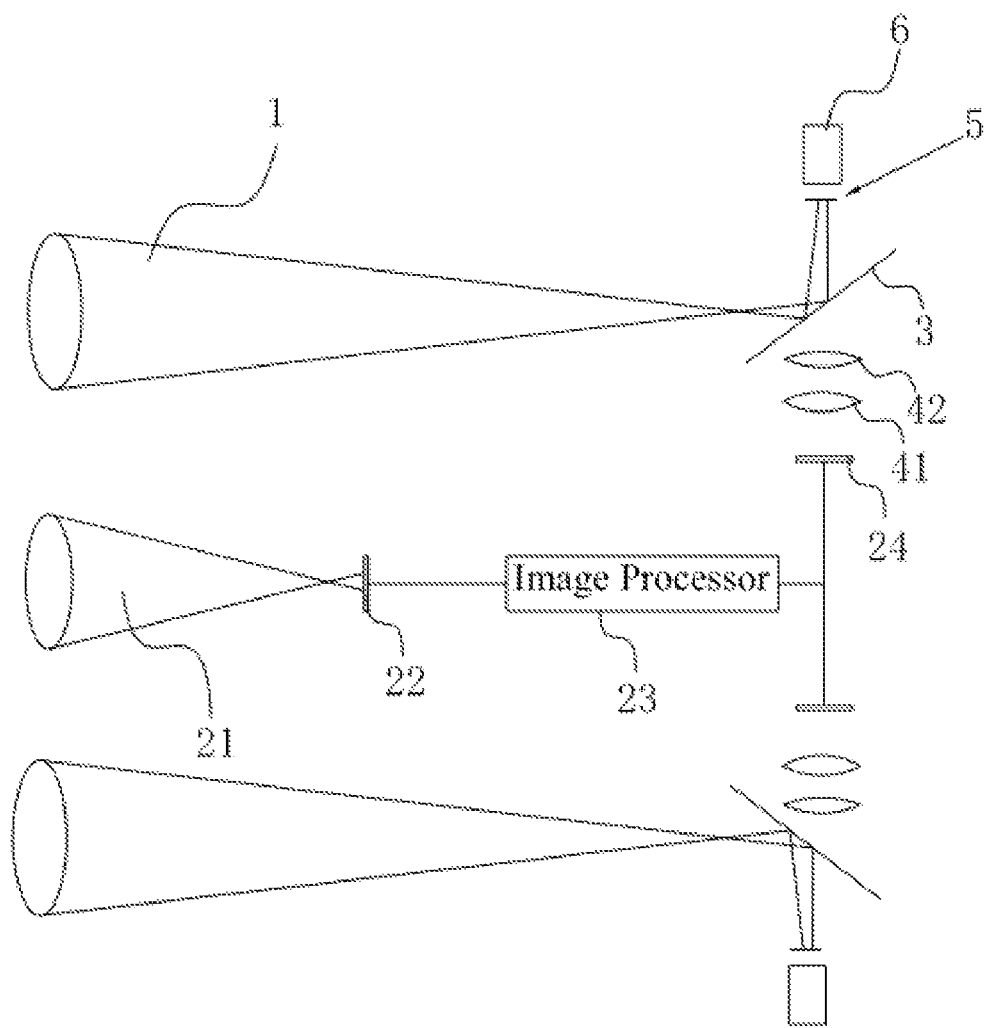
FIG. 5 shows an optical path in another embodiment of the invention.

The difference between this embodiment and embodiment 1 is that, as shown in FIG. 5, the primary objective lens 1, the partially transmissive lens 3, the imaging lens 5, the eyepiece lens 6, the transmission lens set 41, and the electronic display 24 are all set to generate two sets of optical path. The user can view the imaging information of the object through two eyepiece lenses 6, which has the advantage of retaining the stereoscopic visual information due to the parallax optical paths.

Embodiment 4

The difference between this embodiment and embodiment 1 is:
The optical image of the primary objective lens 1 transmits through the partially transmissive lens 3 and projects onto the imaging lens 5. The electronic image of the electronic display 24 is projected onto the imaging lens 5 by the refraction of the partially transmissive lens 3, and the transmission lens set 41 is located between the partially transmissive lens 3 and the primary objective lens 1. By adopting the above technical solutions, the optical image and the electronic image are implemented with a mixed display on the imaging lens 5.

Embodiment 5

Figure 6:
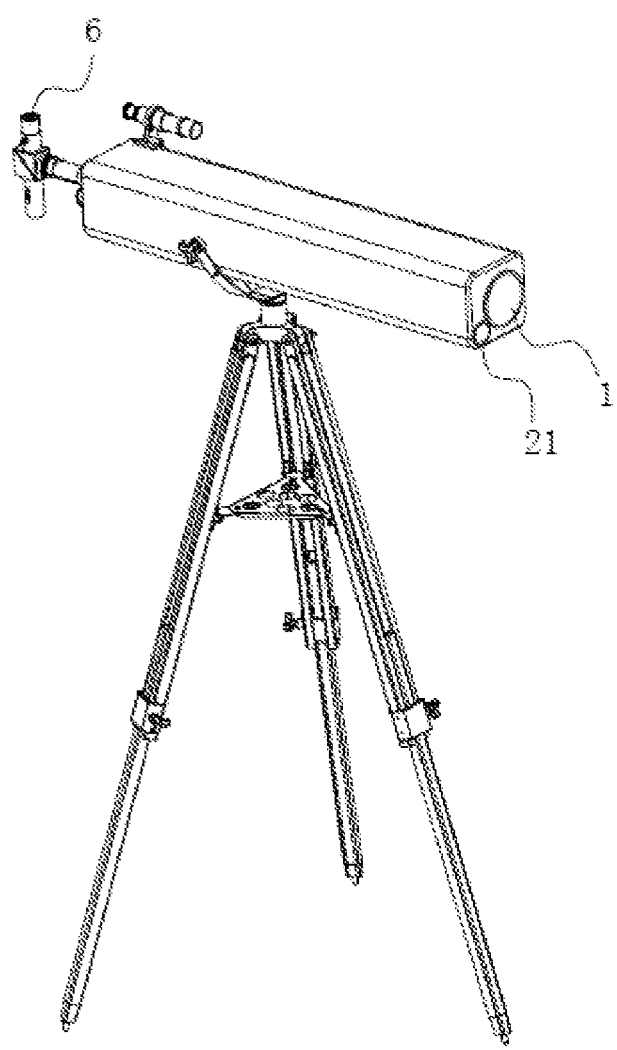
FIG. 6 is a schematic view showing the overall structure of a further embodiment of the invention.

As shown in FIG. 6, the difference between this embodiment and embodiment 1 is that the primary objective lens 1 and the secondary objective lens 21 are provided in the same protective housing so that the telescope has a monolithic structure.

The above embodiments are merely illustrative of the present invention and are not intended to limit the present invention. Those skilled in the art can make non-inventive modifications to present embodiments as needed after reading the present specification; however, it is protected by patent law as long as it falls within the scope of the claims of the present invention.

What is claimed is:

1. An augmented reality telescope, comprising: an optical image acquisition module, an electronic image acquisition module, an imaging module communicating optically with the optical image acquisition module and the electronic image acquisition module, and an image observation module open optically to the imaging module, the imaging module comprises an imaging lens defining an optical axis and an image mixing unit for integrating an optical image output from the optical image acquisition module and an electronic image output from the electronic image acquisition module into the imaging lens, wherein the image mixing unit comprises a partially transmissive lens for reflecting the optical image to the imaging lens and transmitting the electronic image to the imaging lens, wherein the optical image acquisition module comprises a primary objective lens, wherein the electronic image acquisition module comprises a secondary objective lens, an imaging chip communicating optically to the secondary objective lens, an image processor connected to the imaging chip, and an electronic display connected to the image processor, and wherein the primary objective lens and the secondary objective lens are separately disposed, such that the primary objective lens and the partially transmissive lens form an independent optical path, and the secondary objective lens, the imaging chip, the image processor, and the electronic display form an independent electronic path.

2. The augmented reality telescope according to claim 1, wherein the image observation module comprises an eyepiece and/or a display screen.

3. The augmented reality telescope according to claim 2, wherein the primary objective lens is provided with the imaging module.

4. The augmented reality telescope according to claim 3, wherein the imaging chip comprises a CMOS sensor or a CCD sensor.

5. The augmented reality telescope according to claim 4, wherein a transmissive lens set is provided between the partially transmissive lens and the electronic display so that the transmissive lens set can transmit the electronic image displayed on the electronic display to the imaging lens.

6. The augmented reality telescope according to claim 5, wherein the transmissive lens set consists of a plurality of convex lenses and/or concave lenses.

7. The augmented reality telescope according to claim 5, wherein the transmissive lens set is slidably connected to the telescope housing along the optical axis of the imaging lens.

8. The augmented reality telescope according to claim 5, wherein a tuning lens set is provided between the transmissive lens set and the imaging lens for adjusting the size of the image electronic projected on the imaging lens.

* * * * *